Jan. 2, 1951  R. GUYER  2,536,442
CONTAINER

Filed Jan. 27, 1949  2 Sheets-Sheet 1

Inventor
Reynolds Guyer
By Robert M. Dunning

Jan. 2, 1951  R. GUYER  2,536,442
CONTAINER
Filed Jan. 27, 1949  2 Sheets-Sheet 2

Reynolds Guyer, Jr
By Robert M. Dunn

Patented Jan. 2, 1951

2,536,442

UNITED STATES PATENT OFFICE 2,536,442

CONTAINER

Reynolds Guyer, St. Paul, Minn., assignor to Waldorf Paper Products Company, St. Paul, Minn.

Application January 27, 1949, Serial No. 73,049

3 Claims. (Cl. 229—23)

My invention relates to an improvement in container and deals particularly with the type of container which is useful in containing a storage battery or similar article.

Storage batteries comprise somewhat of a problem during transportation. The case of the battery is relatively strong, while the top of the battery is somewhat weaker in construction. The cells of the battery usually include plates which are supported by the top of the battery. If undue pressure is placed upon one point of the top of the battery, damage may result. Furthermore, the batteries are so heavy that occasionally they will drop through the bottom of a container made of corrugated board or similar material. As a result means are necessary to provide for this weight.

It is the object of the present invention to make a battery container having an open bottom so that the battery can not be picked up by engagement of the walls of the container alone. The container is so designed that most of the pressure upon the top of the container is exerted against the marginal edge of the battery within the container.

A feature of the present invention lies in the provision of a sleeve designed to encircle the side walls of a battery and to provide a top which extends into the top of the sleeve to form a closure therefor. The sleeve and the top of the container are shown both provided with downwardly extending marginal flanges designed to abut against the top of the battery case along the marginal upper edge thereof so as to distribute downward pressure on the top of the container to the case of the battery.

A feature of the present invention lies in the provision of an angularly extending sleeve of paperboard or similar material which extends beneath the lower marginal edges of the flanges at the top of the container and the surface of the battery so that the relatively rough lower edges of the corrugated flanges will not mar the upper surface of the battery. The upper end of the batteries are usually covered with a plastic composition somewhat similar to tar or asphalt which is relatively soft. By providing a marginal protective sleeve within the container downward pressure upon the container may transfer strain against the casing of the battery without marring any of the softer material which might overlie the casing.

These and other objects and novel features of my invention will be more clearly and fully set forth in the following specification and claims.

In the drawings forming a part of my specification:

Figure 1:
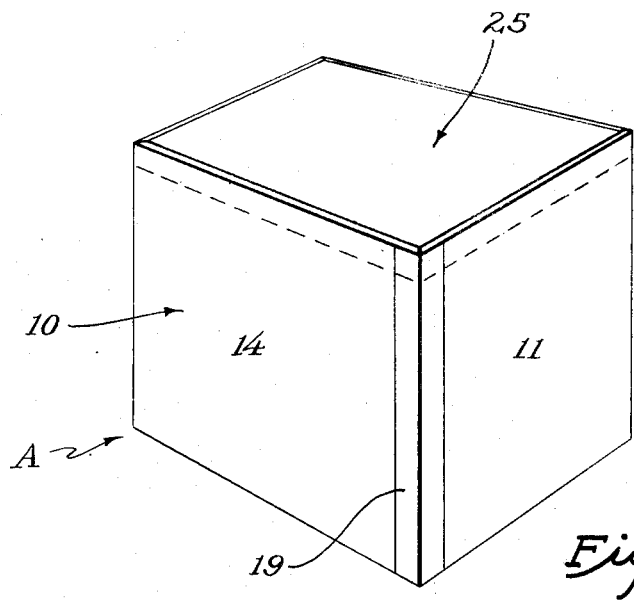
Figure 1 is a perspective view of a battery container showing the construction thereof in assembled form.
Figure 2:
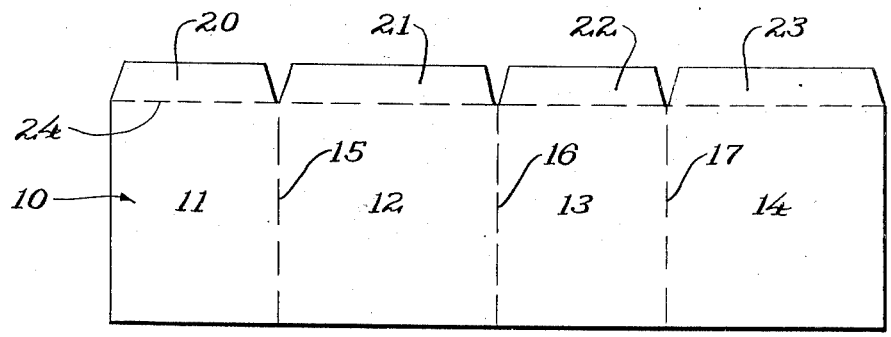
Figure 2 is a diagrammatic view of the blank from which the side walls of the container are formed.

The container A includes an encircling sleeve 10 preferably constructed of a blank shown in Figure 2 of the drawings. The sleeve 10 includes an end wall 11, a side wall 12, an end wall 13, and a side wall 14, connected by parallel fold lines 15, 16, and 17. The free edge of the panel 11 is connected to the free edge of the panel 14 by tape 19 or the like so as to form a tubular sleeve.

Flanges 20, 21, 22 and 23 are foldably connected to the panels 11, 12, 13, and 14 along a common line of fold 24. The flanges 20, 21, 22, and 23 are preferably slightly narrower than the wall panels to which they are connected and may be tapered in form as illustrated so that they may fold readily throughout 180° so that the flanges may lie flat against the inner surface of the walls.

Figure 4:
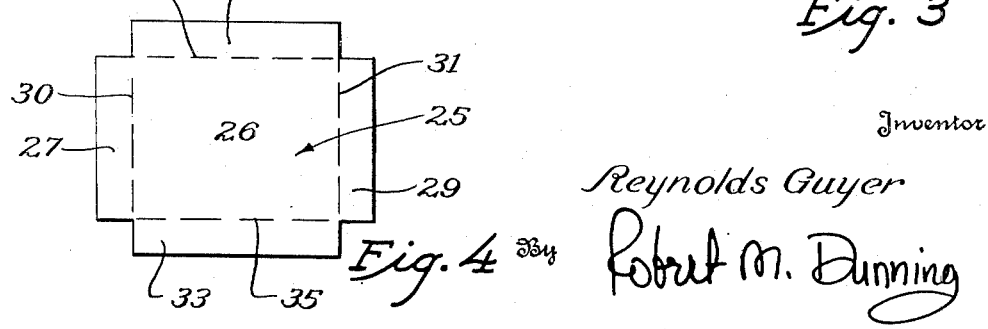
Figure 4 is a top plan view showing the construction of the blank forming the top of the container.
Figures 5, 6:
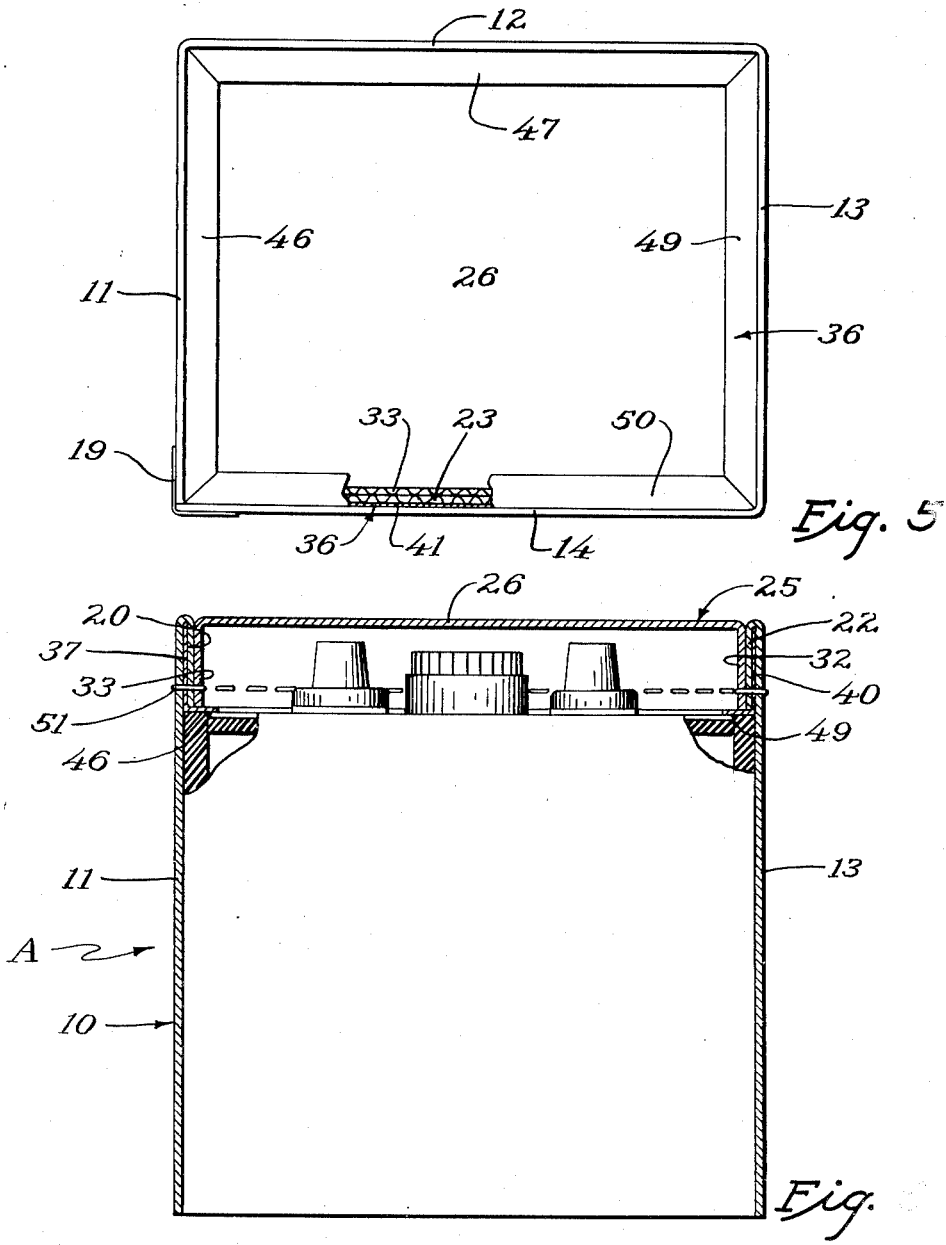
Figure 5 is a bottom plan view of the container looking toward the top thereof, a portion of the inwardly projecting sleeve being cut away to show the construction of the container.
Figure 6 is a sectional view through the container.

The container top is indicated in general by the numeral 25 and is best shown in Figure 4 of the drawings. The top 25 includes a top panel 26 having a pair of opposed flanges 27 and 29 connected to opposite edges thereof along parallel fold lines 30 and 31. Parallel flanges 32 and 33 are also foldably connected to the remaining edges of the top panel 26 along fold lines 34 and 35 respectively. The dimensions of the panel 26 and of the flanges is such that the panel 26 will form a closure between the side walls of the sleeve 10, and the flanges 27, 29, 32, and 33 may fold inwardly of the sleeve flanges 20, 21, 22, and 23.

Figure 3:
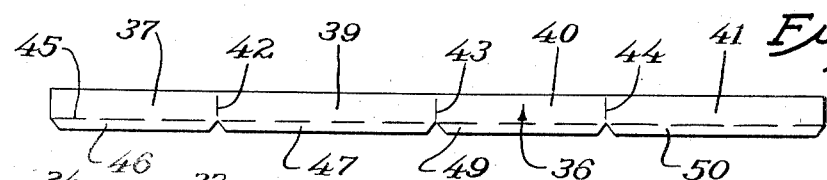
Figure 3 is a diagrammatic view showing the form of the blank of which the marginal sleeve of the container is formed.

An angularly extending protective member 36 is best illustrated in Figure 3 of the drawings. The member 36 includes panels 37, 39, 40, and 41 connected along parallel fold lines 42, 43, and 44. The various panels are connected along a common line of fold 45 to flanges 46, 47, 49 and 50. The ends of the flanges 46, 47, 49 and 50 are notched at substantially 45° so that the flanges may extend in co-planar relation with the notched edges thereof forming mitered corners.

The member 36 is designed to be enclosed between the sleeve flanges and the sleeve wall panels and the panels of the protective member 36 are properly proportioned to fit within the side wall panels of the sleeve 10. The panels 37 and 40 may fit within the side walls 10 and 13 and be enclosed by the sleeve flanges 20 and 22. The panels 39 and 41 are designed to lie inwardly of the sleeve panels 12 and 14 and to be enclosed by the marginal flanges 21 and 23. Stitches or staples 51 extend through the flanges of the top 25, through the flanges of the sleeve 10 and through the panels of the protective member 36 to secure these elements in proper relationship.

When the container is formed in the manner described and illustrated the flanges 46, 47, 49 and 50 of the protective member 36 are folded into substantially co-planar relation beneath the down-turned flanges on the side walls and on the top panel. The flanges of the protective member merely overlie the upper marginal edge of the battery casing and serve as a protection therefor. The double thickness flange structure encircling the upper end of the container rests upon the flanges of the protective member and strain upon the cover is transmitted through these flanges to the battery casing. As a result the batteries may be stacked one upon another and most of the weight of the batteries is exerted upon the battery casing rather than upon the battery posts terminals or filling plugs.

In accordance with the patent statutes, I have described the principles of construction and operation of my container, and while I have endeavored to set forth the best embodiment thereof, I desire to have it understood that obvious changes may be made within the scope of the following claims without departing from the spirit of my invention.

I claim:

1. A battery container including a sleeve, a marginal sleeve within said first named sleeve at the upper extremity thereof, a cover panel having marginal down-turned flanges arranged inwardly of said second sleeve, the flanges of said cover panel being secured to said first and second sleeve, and a protective member of angular cross section enclosed between the first and second sleeves and extending laterally beneath the second sleeve and the flanges of the cover member.

2. A battery container in combination with a battery having a casing shell, the container including a sleeve designed to enclose the side walls of the casing, flanges hingedly connected to the upper ends of the sleeve and folded inwardly into parallel relation with the walls to which they are secured, a cover including a cover panel and down-turned marginal flanges thereon extending downwardly in parallel contacting relation to said flanges on said sleeve, said flanges transmitting downward pressure to the shell of the battery, and an angular protective member including one flange sandwiched between said sleeve and the down-turned flanges thereon and second flanges folding inwardly beneath the flanges of the sleeve and cover member, said protective member resting upon the shell of the battery.

3. A battery container including a sleeve, a cover panel having marginal down-turned flanges arranged inwardly of said sleeve at the upper end thereof, means connecting the flanges of the cover panel to said sleeve, and a protective member of angular cross section enclosed between the flanges and the sleeve and extending laterally beneath the flanges of the cover member.

REYNOLDS GUYER.

REFERENCES CITED

The following references are of record in the file of this patent:

UNITED STATES PATENTS

| Number | Name | Date |
|---|---|---|
| 1,257,931 | Rowell | Feb. 26, 1918 |
| 2,053,686 | Powell et al. | Sept. 8, 1936 |